(12) United States Patent
Sebree et al.

(10) Patent No.: US 12,508,270 B2
(45) Date of Patent: Dec. 30, 2025

(54) TREATMENT OF BEHAVIORAL IMPAIRMENT IN DEVELOPMENTAL AND EPILEPTIC ENCEPHALOPATHY

(71) Applicant: Harmony Biosciences Management, Inc., Plymouth Meeting, PA (US)

(72) Inventors: Terri Sebree, Gladwyne, PA (US); Donna Gutterman, Raleigh, NC (US); John Messenheimer, Moncure, NC (US)

(73) Assignee: Harmony Biosciences Management, Inc., Plymouth Meeting, PA (US)

( * ) Notice: Subject to any disclaimer, the term of this patent is extended or adjusted under 35 U.S.C. 154(b) by 764 days.

(21) Appl. No.: 17/697,629

(22) Filed: Mar. 17, 2022

(65) Prior Publication Data
US 2022/0218625 A1 Jul. 14, 2022

Related U.S. Application Data

(63) Continuation of application No. PCT/US2020/051102, filed on Sep. 16, 2020.

(60) Provisional application No. 62/901,651, filed on Sep. 17, 2019.

(51) Int. Cl.
| | |
|---|---|
| *A61M 21/02* | (2006.01) |
| *A61K 31/00* | (2006.01) |
| *A61P 25/08* | (2006.01) |
| *A61P 25/28* | (2006.01) |
| *A61M 21/00* | (2006.01) |

(52) U.S. Cl.
CPC ........... *A61K 31/658* (2023.05); *A61M 21/02* (2013.01); *A61P 25/08* (2018.01); *A61P 25/28* (2018.01); *A61M 2021/0077* (2013.01)

(58) Field of Classification Search
CPC .......... A61K 31/05; A61P 25/28; A61P 25/08; A61M 21/02; A61M 2021/0077
See application file for complete search history.

(56) References Cited

U.S. PATENT DOCUMENTS

| | | |
|---|---|---|
| 2016/0256410 A1 | 9/2016 | Aung-Din |
| 2017/0231923 A1 | 8/2017 | Guy et al. |
| 2018/0161356 A1 | 6/2018 | Olson et al. |
| 2019/0083388 A1 | 3/2019 | Gutterman et al. |

FOREIGN PATENT DOCUMENTS

| | | |
|---|---|---|
| WO | WO-2018011808 A1 | 1/2018 |
| WO | 2019058261 A1 | 3/2019 |
| WO | 2019064234 A1 | 4/2019 |
| WO | WO-2019089583 A1 | 5/2019 |
| WO | 2022017942 A1 | 1/2022 |

OTHER PUBLICATIONS

Ali, Shayma, Ingrid E. Scheffer, and Lynette G. Sadleir. "Efficacy of cannabinoids in paediatric epilepsy." Developmental Medicine & Child Neurology 61.1 (2019): 13-18. (Year: 2019).*
Buck, Deborah, et al. "The development and validation of the Epilepsy and Learning Disabilities Quality of Life (ELDQOL) scale." Epilepsy & behavior 10.1 (2007): 38-43. (Year: 2007).*
Onis, Mercedes de, et al. "Development of a WHO growth reference for school-aged children and adolescents." Bulletin of the World health Organization 85.9 (2007): 660-667. (Year: 2007).*
Lattanzi, Simona, et al. "Efficacy and safety of adjunctive cannabidiol in patients with LennoxäGastaut syndrome: a systematic review and meta-analysis." CNS drugs 32 (2018): 905-916. (Year: 2018).*
Poster, A. E. S. "Safety and Tolerability of ZYN002 (Synthetic Cannabidiol) Transdermal Permeation-Enhanced Gel in Healthy Subjects and Epilepsy Patients: Three Phase 1, Randomized, Double-Blind, Placebo-Controlled Studies." (2016). (Year: 2016).*
Vlaskamp, Danique RM, et al. "SYNGAP1 encephalopathy: A distinctive generalized developmental and epileptic encephalopathy." Neurology 92.2 (2019): e96-e107. (Year: 2019).*
Kuchenbuch, Mathieu, et al., "Add-on cannabidiol significantly decreases seizures in 3 patients with SYNGAP1 developmental and epileptic encephalopathy," Epilepsia Open, vol. 5:496-500 (2020).
SynGAP Research Fund, Webinar, CBD, Seizures & SynGAP: Parents Experience (2019).
Vlaskamp, Danique R.M., et al., "SYNGAP1 encephalopathy: A distinctive generalized developmental and epileptic encephalopathy," Neurology, vol. 92(2):e96-e107 (2019).
"Lacking guidance from doctors, parents lead the charge in treating children with CBD," Peninsula Press (2018).
International Preliminary Report on Patentability for corresponding PCT/US2020/051102, mailed Mar. 15, 2022, 5 pages.
ACNP 57th Annual Meeting: Poster Session III, Neuropsychopharmacology, Springer International Publishing, vol. 43 (1):383-527, XP037114792 (2018).
Messenheimer, John, et al., "Transdermal Cannabidiol (CBD) Gel for the Treatment of Focal Epilepsy in Adults", 2018 Annual Meeting of the American Academy of Neurology, XP093056446 (2018).
International Search Report and Written Opinion of related PCT Application No. PCT/US2020/051102 mailed Dec. 18, 2020, 7 pages.
Ali, Shayma et al., "Efficacy of cannabinoids in paediatric epilepsy", Developmental Medicine & Child Neurology, vol. 61:13-18 (2019).
Holder, J. Lloyd, te al., "SYNGAP1-Related Intellectual Disability", Feb. 21, 2019, NIH, U.S. National Library of Medicine, In: Adam MP, Feldman J, Mirazaa GM, et al., editors; GeneReviews [Internet]; Seattle (WA): University of Washington, Seattle; 1993-2024 (2019).

(Continued)

*Primary Examiner* — James H Alstrum-Acevedo
*Assistant Examiner* — Justin Christopher Sanchez
(74) *Attorney, Agent, or Firm* — WOMBLE BOND DICKINSON (US) LLP; Danielle L. Herritt; Mark R. Deluca

(57) ABSTRACT

The present technology relates to methods of treating behavioral problems and seizures in a subject having developmental and epileptic encephalopathy (DEE) by transdermally administering an effective amount of cannabidiol (CBD) to the subject wherein behavioral problems are treated in the subject.

14 Claims, 1 Drawing Sheet

(56) References Cited

OTHER PUBLICATIONS

Bruni, Natascia, et al., "Cannabinoid Delivery Systems for Pain and Inflammation Treatment", Molecules (2018), 23, 2478.
Zynerba: "Zynerba Pharmacuetics Provides Clinical Update and Announces Two Clinical Indications", retrieved from the internet at URL: <https://www.zynerba.com/zynerbapharmaceuticals-provides-clinical-update-and-announces-two-new-clinical-indications/>, Dec. 17, 2018.

* cited by examiner

Reduction in Seizure Frequency and ≥50% Responder Rate

| FAIS and Convulsive Seizures (n=46) | Month 1 | Month 2 | Month 3 | Month 4 | Month 5 | Month 6 |
|---|---|---|---|---|---|---|
| Median % reduction in seizure frequency | 16% | 44% | 44% | 47% | 58% | 51% |
| ≥ 50% responder rate | 30% | 42% | 46% | 47% | 63% | 55% |

| LGS and Dravet Syndrome (n=13) | Month 1 | Month 2 | Month 3 | Month 4 | Month 5 | Month 6 |
|---|---|---|---|---|---|---|
| Median % reduction in seizure frequency | 18% | 6% | 46% | 23% | 63% | 51% |
| ≥ 50% responder rate | 36% | 36% | 46% | 40% | 64% | 60% |

(FIAS + BTCS + GTCS)

TREATMENT OF BEHAVIORAL IMPAIRMENT IN DEVELOPMENTAL AND EPILEPTIC ENCEPHALOPATHY

RELATED APPLICATIONS

This application is a continuation of International Application No. PCT/US2020/051102, filed Sep. 16, 2020, and claims the benefit of U.S. Provisional Application No. 62/901,651, filed on Sep. 17, 2019, the entire contents of each of which are incorporated herein by reference for all purposes.

FIELD OF THE TECHNOLOGY

The present disclosure relates to methods of treating behavioral problems in childhood epilepsy disorders by transdermally administering an effective amount of cannabidiol (CBD) to a subject in need.

BACKGROUND

Although individually rare, developmental and epileptic encephalopathies (DEE), which include Lennox-Gastaut and Dravet Syndromes, among others, collectively exact an immense personal, medical, and financial toll on affected children and their families, healthcare providers, and the healthcare system. Stafstrom et al., "Epileptic Encephalopathy in Infants and Children" *Epilepsy Curr* 16(4):273-279 (2016). Patients with DEE not only have seizures—as is clear from the name—but independently also experience cognitive and behavioral problems, such as social-communication deficits. Scheffer et al., "ILAE classification of the epilepsies: Position paper of the ILAE Commission for Classification and Terminology" *Epilepsia* 58(4):512-521 (2017). This impacts the overall quality of life of children with DEE from childhood and throughout their entire lives, even if seizures can be addressed by one or a combination of antiepileptic medications. And the failure of treatment to improve either seizures or encephalopathy is commonplace, as epileptic encephalopathies are highly resistant to treatment. Vigevano et al., "Therapeutic approach to epileptic encephalopathies" *Epilepsia* 54:45-50 (2013).

Cannabinoids are a class of chemical compounds found in the *Cannabis* plant. The two primary cannabinoids contained in *Cannabis* are cannabidiol, or CBD, and Δ9-tetrahydrocannabinol, or THC. CBD lacks the psychoactive effects of THC. Studies have shown that CBD can be used to treat disorders such as epilepsy, arthritis, and cancer.

EPIDIOLEX oral CBD solution has been approved for treatment of epilepsy in children with Lennox-Gastaut and Dravet syndrome. However, oral delivery has translated to gastrointestinal (GI) adverse events, e.g., the EPIDIOLEX label reports somnolence and sedation in 32% of its patients and was dose related. EPIDIOLEX Cannabidiol Oral Solution Label (June 2018). Oral CBD also has the potential to degrade in gastric acid into THC, which can be associated with unwanted psychoactive effects. Id.

There exists a need for a treatment of behavioral problems, in addition to seizures, in patients with DEE. A treatment is also needed that does not produce unwanted side effects such as somnolence, lethargy, withdrawal, sedation, which can counteract any benefit in behavioral symptoms, or exacerbate the effects of behavioral problems.

SUMMARY

The present disclosure relates to a method of treating behavioral problems and seizures in a subject having developmental and epileptic encephalopathy (DEE), including transdermally administering an effective amount of cannabidiol (CBD) to the subject, wherein behavioral problems are treated in the subject. The subject having developmental and epileptic encephalopathy (DEE) includes the subject having SYNGAP1 encephalopathy.

On Friday, May 31, 2019, the United States Food and Drug Administration Center for Food Safety and Applied Nutrition held a public hearing (Part 15) meeting entitled "Scientific Data and Information about Products Containing *Cannabis* or *Cannabis*-Derived Compounds." Monica Weldon, who is the president and CEO of Bridge the Gap, SYNGAP Education Research Foundation, spoke at the public hearing. Monica Weldon spoke about the need to treat SYNGAP. She began her speech by helping describe the perspective of a parent whose child has SYNGAP symptoms:

Imagine being told there is no FDA-approved product for your child. Picture watching your children suffer from a rare genetic disorder that physicians barely understand, marked by seizures, mood disorders, the inability for your child to communicate due to their being nonverbal. Put yourself in the shoes of a parent or a caregiver who is disparate [sic] for their child—to treat their child's challenges, even just to find out what's wrong.

Now insert CBD. With all its confusing descriptions, derivative products, vague dosage recommendations, the cure-all marketing and then you create a legal environment of ambiguity around it and now you've just created the Wild West of CBD.

Like many pediatric rare disease advocates, we are particularly sensitive to new emerging therapies that are going to help our children.

Patients and their families look to us for guidance and trusted educational materials on potential treatments, especially as we work closely with researchers to develop targeted therapies for SYNGAP1. We have no approved targeted therapy for our children. So therefore we are focused on short-term repurposing of drugs and natural medications to mitigate SYNGAP1 symptoms.

CBD-based pharmaceuticals and OTC CBD products come up in conversations all the time. Our greatest challenge as an organization is how to address them. At this stage, we need further scientific research when it comes to safety, efficacy, product integrity, drug interactions, further CBD research will answer many of our questions.

The present disclosure addresses the need discussed by the president and CEO of Bridge the Gap, SYNGAP Education Research Foundation. The present disclosure relates to a method of treating DEE, including SYNGAP1 encephalopathy, by transdermally administering an effective amount of cannabidiol (CBD) to the subject, wherein one or more symptoms, such as behavioral problems, are treated in the subject.

In some embodiments, seizures are also treated. In some embodiments, seizures are treated such that the subject is a 35% responder, 50% responder, or a 90% responder within 30 days.

The effective amount of CBD can be between about 250 mg to about 1000 mg daily. In some embodiments, the effective amount of CBD is initiated at about 250 mg daily and titrated up to about 500 mg daily dose or about 1000 mg daily. The effective amount of CBD can be initiated at about 50 mg daily and titrated up to about 250 mg daily. In some embodiments, the effective amount of CBD is initiated at 250 mg daily. The effective amount of CBD can be initiated at 500 mg daily. In some embodiments, the 500 mg daily dose and the 1000 mg daily dose is administered to patients that weigh greater than 25 kg. The CBD can be administered in a single daily dose or in two daily doses. In some embodiment the effective amount is 750 mg daily or 1000 mg daily.

The CBD can be formulated as a gel. In some embodiments, the CBD is formulated as a permeation-enhanced gel. The gel can contain between 1% (wt/wt) CBD to 7.5% (wt/wt) CBD. In some embodiments, the gel contains 4.2% (wt/wt) CBD. In some embodiments, the gel contains 7.5% (wt/wt) CBD.

In some embodiments, the transdermal preparation can be a cream, a salve, a lotion, or an ointment. The CBD can be delivered by a bandage, pad or patch.

The CBD can be administered transdermally on the subject's upper arm and shoulder. In some embodiments, the CBD is administered transdermally on the subject's thigh or back.

The CBD can be synthetic CBD. The CBD can be purified CBD. The CBD can be botanically derived.

Transdermally administering an effective amount of cannabidiol (CBD) can reduce an intensity of at least one adverse event or side effect relative to orally administering CBD. The at least one adverse event or side effect can be a gastrointestinal (GI) adverse event. The at least one adverse event or side effect can be liver function. In some embodiments, the at least one adverse event is somnolence. In some embodiments, the frequency and intensity of somnolence is reduced as an adverse event.

BRIEF DESCRIPTION OF THE DRAWINGS

FIG. 1 is a table of the reduction in seizure frequency and greater than 50% Responder rate.

DETAILED DESCRIPTION

Provided herein is a method of treating behavioral problems and seizures in a subject having developmental and epileptic encephalopathy (DEE) by transdermally administering an effective amount of cannabidiol (CBD) to the subject, wherein behavioral problems are treated in the subject. The subject having developmental and epileptic encephalopathy (DEE) includes the subject having SYN-GAP1 encephalopathy.

The trial summarized in the examples—a Phase 2 open label clinical trial—assessed the safety and efficacy of transdermal administration of CBD in developmental and epileptic encephalopathy (DEE), a heterogeneous group of rare pediatric epilepsy syndromes, including Dravet Syndrome (DS) and Lennox-Gastaut Syndrome (LGS). The most common and debilitating seizure type in people with epilepsy are focal impaired-awareness and convulsive seizures. Patients who experienced these seizure types achieved 44% to 58% monthly median reductions in seizures compared to baseline from month 2 to month 6 of treatment. Qualitative assessments by caregivers in the study indicate improved many behavioral problems including improved mood, engagement with other, learning ability, alertness, school attendance, and cognitive symptoms of DEE.

Definitions

As used herein, the term "treating" or "treatment" refers to mitigating, improving, relieving, or alleviating at least one symptom (such as a behavioral symptom) of a condition, disease or disorder in a subject, such as a human, or the improvement of an ascertainable measurement associated with a condition, disease or disorder.

As used herein, the term "clinical efficacy" refers to the ability to produce a desired effect in humans as shown through a Food and Drug Administration (FDA), or any foreign counterparts, clinical trial.

As used herein, the term "cannabidiol" or "CBD" refers to cannabidiol; cannabidiol prodrugs; pharmaceutically acceptable derivatives of cannabidiol, including pharmaceutically acceptable salts of cannabidiol, cannabidiol prodrugs, and cannabidiol derivatives. CBD includes, 2-[3-methyl-6-(1-methylethenyl)-2-cyclohexen-1-yl]-5-pentyl-1,3-benzenediol as well as to pharmaceutically acceptable salts, solvates, metabolites (e.g., cutaneous metabolites), and metabolic precursors thereof. The synthesis of CBD is described, for example, in Petilka et al., *Helv. Chim. Acta*, 52:1102 (1969) and in Mechoulam et al., *J. Am. Chem. Soc.*, 87:3273 (1965), which are hereby incorporated by reference.

The term "epileptic encephalopathy" refers to epileptic activity that itself contributes to severe cognitive and behavioral problems above and beyond what may be expected from the underlying pathology alone (e.g., cortical malformation). Onset of these impairments can occur at any age.

The term "developmental and epileptic encephalopathy" or "DEE" refers to severe epilepsy disorders with onset in infancy and childhood. DEE is characterized by the presence of multiple focal and generalized seizure types and severe cognitive and behavioral problems. In DEE, cognitive and behavioral problems can occur independently of seizure activity, even before seizures become frequent, suggesting a developmental component in addition to an epileptic component to DEE. Such impairment can happen early, or worsen over time. Scheffer, "ILAE classification of the epilepsies: Position paper of the ILAE Commission for Classification and Terminology" *Epilepsia* 58(4):512-521, 2017. DEE includes genetic epilepsies, such as CDKL5, SCN1A-, and STXBP1-related disorders. It also includes Lennox-Gastaut Syndrom (LGS), Ohtahara, West, Landau-Kleffner, Doose, Dravet Syndrome (DS), and Infantile Spasms (IS).

As used herein, the term "behavioral problems" refers to behavioral deficits or regression such as social-communication, mood, oppositional and defiant behavior, tantrums and self-injury or language impairment deficit or regression.

As used herein, the term "transdermally administering" refers to contacting the CBD with the patient's or subject's skin under conditions effective for the CBD to penetrate the skin.

The term developmental and epileptic encephalopathy (DEE) was recently introduced by the International League Against Epilepsy (ILAE) Task Force on Classification and Terminology (Scheffer et al. 2017) to more fully describe the clinical presentation of co-existing developmental impairment and epileptic encephalopathy. Historically, epileptic encephalopathy, without the term 'developmental,' was used in the broader sense to encompass both concepts. In 2001, ILAE recognized epileptic encephalopathies as a distinct category. Engel, "A proposed diagnostic scheme for people with epileptic seizures and with epilepsy: report of the ILAE Task Force on Classification and Terminology" *Epilepsia* 42:796-803 (2001). The ILAE defined an epileptic encephalopathy as a condition in which "the epileptiform EEG abnormalities themselves are believed to contribute to a progressive disturbance in cerebral function." In 2010, the ILAE redefined epileptic encephalopathy as a condition where the epileptic activity itself may contribute to severe cognitive and behavioral problems above and beyond what might be expected from the underlying pathology alone (e.g., cortical malformation), and that these can worsen over time. Berg et al., "Revised terminology and concepts for organization of seizures and epilepsies: report of the ILAE Commission on Classification and Terminology, 2005-2009" *Epilepsia* 51:676-685 (2010).

The most recent change to include 'developmental' in the description was done to allow specific recognition of patients who present with both developmental impairment and epileptic encephalopathy verses developmental impairment without frequent epileptic activity associated with developmental impairment or epileptic encephalopathy where there is no pre-existing development of impairment. A key component of the concept is that amelioration of the epileptiform activity may have the potential to improve the developmental consequences of the disorder (Scheffer et al. 2017).

The overall incidence and prevalence of developmental epileptic encephalopathies are low. Patients with DEE may include, but are not limited to, patients with Lennox-Gastaut syndrome, Dravet syndrome, Doose syndrome (Epilepsy with Myoclonic Atonic Seizures (EMAS)), West syndrome (Infantile Spasms), Landau-Kleffner syndrome, or genetic disorders such as CDKL5 encephalopathy and CHD2 encephalopathy.

The seizures in patients with DEE are generally refractory to standard antiepileptic drugs (AEDs). As a result, more aggressive adjunctive use of AEDs considered effective in suppressing interictal epileptiform discharges (e.g., benzodiazepines, valproic acid, and lamotrigine), immunomodulatory therapies (e.g., corticosteroids, intravenous immunoglobulin [IVIG], plasmapheresis), ketogenic diet, and surgical options are often considered.

While patients with DEE may present with a variety of seizure types and sub-disorders, the only DEE subtypes for which one or more AEDs are currently approved by the US FDA for adjunctive therapy are Lennox-Gastaut Syndrome, Dravet Syndrome, and infantile spasms (Table 1).

TABLE 1

Current US FDA Approved Medicines by DEE Subtype

| DEE Subtype | US FDA Approved Medicines |
| --- | --- |
| Lennox-Gastaut syndrome | Cannabidiol, clobazam, lamotrigine, rufinamide, topiramate, felbamate, clonazepam |
| Dravet Syndrome | Cannabidiol |
| Infantile spasms (West Syndrome) | Vigabatrin, adrenocorticotropic hormone (ACTH) |

Given treatment refractoriness and limited approved medicines with evidence from controlled trials, clinicians are often left with using standard AEDs in a trial and error fashion, largely based on clinical experience or open label trials. Lennox-Gastaut syndrome and Dravet syndrome have been the DEE subtypes for which the most evidence from controlled trials of antiepileptic drugs has been generated.

Vlaskamp et al. looked at a patient cohort of 57 patients (53% male, median age 8 years) with SYNGAP1 mutations or microdeletions. Vlaskamp et al., "SYNGAP1 encephalopathy: A distinctive generalized developmental and epileptic encephalopathy" *Neurology* 2019; 92:e96-e107 (2019). Table 2 outlines the phenotypic profile of the SYNGAP1 patients who had either mutations, variants or microdeletions.

TABLE 2

Characteristics of Patients with SYNGAP1

| | Total Cohort (n = 57) |
| --- | --- |
| Male, n (%) | 30 (52.6) |
| Median age at study (range) | 8 years 3 months (18 months - 33 years) |
| Seizures, n (%) | 56 (98.2) |
| Median Age at seizure onset (range) | 2 years (4 months - 7 years 3 months) |
| Multiple seizure types, n (%) | 35 (61.4) |
| Generalized seizures, n (%) | 55 (96.5) |
| Any absences, n (%) | 53 (93.0) |
| Eyelid Myoclonia (EM) | 37 (64.9) |
| EM - myoclonic-atonic | 5 (8.8) |
| EM - atonic | 8 (14.0) |
| Atypical absences | 11 (19.3) |
| Typical absences | 10 (17.5) |
| Myoclonic absences | 2 (3.5) |
| Myoclonic | 19 (33.3) |
| Atonic | 8 (14.0) |
| Myoclonic-atonic | 3 (5.3) |
| Unclassified drop attacks | 2 (3.5) |
| Tonic-clonic seizures, n (%) | 14 (24.6) |
| Focal Seizures, n (%) | 7 (12.3) |
| Seizure-free, n (%, median age, range) | 10 (17.8, 7.5 years, 3-13 years) |
| Developmental Delay, n (%) | 54/56 (96.4) |
| Intellectual disability (ID, %): | 55 (96.5): |
| moderate-severe ID (%) | 50 (87.7) |
| Regression (%, median age, range) | 32/56 (57.1, 2 years, 6 months - 18 years) |
| Autism spectrum disorder, n (%) | 30 (52.6) |
| Severe behavioral problems, n (%) | 41/56 (73.2) |
| Eating problems, n (%) | 39 (68.4) |
| Sleep problems, n (%) | 34/55 (61.8) |
| Ataxia or gait abnormalities, n (%) | 29 (50.9) |

(Vlaskamp 2019)

For Table 2, the following abbreviations mean: EM is eyelid myoclonia with or without absences and ID is intellectual disability. If patients had missing information, a denominator is given that represents the number of patients with known information on this variable. If no denominator is given, there was information on all patients. Eating problems included a poor intake, uncontrolled eating with gorging, eating inedible objects, difficulties with transition from fluids to solid food in early childhood, and difficulties with chewing and swallowing.

With further regards to Table 2, developmental delay was identified soon after birth in 55 of 56 (96%) patients and preceded seizure onset in all. Development regressed or plateaued with seizure onset in 56 patients. Language was severely impaired, with 12 patients being nonverbal, at age 2 to 33 years. ID was present in 55 of 57 patients, being moderate to severe in 50 and mild in 5. Behavioral problems were seen in 41 of 56 (73%) patients and were often severe with oppositional and defiant behavior with aggression, self-injury, and tantrums. ASD was diagnosed in 30 (53%) patients.

The University of Washington Caregiver Stress Scale (UW-CSS)

The UW-CSS measures the stress experienced by caregivers of children under 18, and was developed to address areas of stress important to caregivers of children with severe epilepsy. University of Washington Caregiver Stress Scale (UW-CSS) Version 1 Users Guide. 2017; Jensen et al., "Life impact of caregiving for severe childhood epilepsy: Results of expert panels and caregiver focus groups" Epilepsy Behav (2017).

The Epilepsy and Learning Disabilities Quality of Life (ELDQOL)

The Epilepsy and Learning Disabilities Quality of Life (ELDQOL) scale is questionnaire that covers seizure severity, seizure-related injuries, AED side-effects, behavior, mood, physical, cognitive and social functioning, parental concern, communication, overall QOL and overall health.

Sleep Disturbance Scale for Children (SDSC)

The SDSC was created to evaluate sleep disorders in children, and to provide an overall measure of sleep disturbance suitable for use in clinical screening and research. Developers Bruni and colleagues, developed six categories representing sleep difficulties affecting children ages 6 to 15 years old: initiating and maintaining sleep, sleep breathing disorders, arousal/nightmares, sleep-wake transition, excessive somnolence, and sleep hyperhidrosis (nighttime sweating). Bruni et al, "The Sleep Disturbance Scale for Children (SDSC). Construction and validation of an instrument to evaluate sleep disturbances in childhood and adolescence" J Sleep Res 5(4):251-61 (1996). Patients/parents use a five-point scale to indicate frequency from 1 (never) to 5 (always). Higher scores indicate more acute sleep disturbances. Scores are tallied for each of the six sleep-disorder categories, and an overall score is calculated. Shahid et al. (eds.), STOP, THAT and One Hundred Other Sleep Scales 82:331-332 (Springer Science+Business Media, LLC 2012).

Vineland Adaptive Behavior Scale-3 (VABS-3)

The VABS-3 is an individually administered measure of adaptive behavior in four domains: Communication, Daily Living Skills, Socialization, and Motor Skills. It also provides a composite score that summarizes the individual's performance across all four domains. It is widely used in the assessment of individuals with intellectual, developmental and other disabilities.

Qualitative Caregiver Feedback

Qualitative assessment of improvement, worsening, or no change for the patient and family, such as but not limited to, daily activities, school attendance and alertness. In the examples, clinicians were asked to capture qualitative caregiver feedback at Week 26 with the following questions asked: (1) "Has anything improved for [patient name] and your family since [patient name] has been using the gel?"; (2) "Has anything got worse since for [patient name] and your family since [patient name] has been using the gel?"; and (3) "Let me just ask about a few specific things: Daily activities e.g. school attendance? If so how? Alertness? If so how?".

Transdermal Pharmaceutical Compositions

Transdermal delivery of cannabinoids (e.g., CBD) has benefits over oral dosing because it allows the drug to be absorbed through the skin directly into the bloodstream. This avoids first-pass liver metabolism, enabling lower dosage levels of active pharmaceutical ingredients with a higher bioavailability and improved safety profile. Transdermal delivery also avoids the gastrointestinal tract, lessening the opportunity for GI related adverse events and the potential degradation of CBD by gastric acid into THC, which can be associated with unwanted psychoactive effects. Moreover, transdermal delivery of CBD reduces the intensity and frequency of somnolence adverse events, which are typically present in oral dosing of CBD. Transdermal delivery of CBD can avoid liver function adverse events, which are typically present in oral dosing of CBD. In some embodiments, transdermally administering an effective amount of CBD reduces an intensity of at least one adverse event by about 15% to about 95% relative to orally administering CBD.

The CBD can be in a gel form and can be pharmaceutically-produced as a clear, permeation-enhanced gel that is designed to provide controlled drug delivery transdermally with once- or twice-daily dosing. The CBD gel can between 1% (wt/wt) CBD to 7.5% (wt/wt) CBD. The CBD gel can have, for example, 4.2% (wt/wt) CBD or 7.5% (wt/wt) CBD). The CBD gel can be applied topically by the patient or caregiver to the patient's upper arm and shoulder, back, thigh, or any combination thereof.

The CBD gel can include diluents and carriers as well as other conventional excipients, such as wetting agents, preservatives, and suspending and dispersing agents.

The CBD gel can include a solubilizing agent, a permeation enhancer, a solubilizer, antioxidant, bulking agent, thickening agent, and/or a pH modifier. The composition of the CBD gel can be, for example, a. cannabidiol present in an amount of about 0.1% to about 20% (wt/wt) of the composition; b. a lower alcohol having between 1 and 6 carbon atoms present in an amount of about 15% to about 95% (wt/wt) of the composition; c. a first penetration enhancer present in an amount of about 0.1% to about 20% (wt/wt) of the composition; and d. water in a quantity sufficient for the composition to total 100% (wt/wt). Other formulations of the CBD gel can be found in International Publication No. WO 2010/127033, the entire contents of which are incorporated herein by reference.

The effective amount of CBD can be between about 50 mg to about 1000 mg daily, which can be administered in a single daily dose or twice daily dosing.

EXEMPLIFICATION

Example 1: Study of ZYN-002 in Children with Developmental Epileptic Encephalopathies This was a sequential, multi-stage, open-label, multinational, multiple-center, multiple-dose study to assess the long-term safety and tolerability of ZYN002 (transdermal CBD gel) in child and adolescent epilepsy patients from 3 to 18 years of age having seizures associated with developmental and epileptic encephalopathies (DEE) according to the International League Against Epilepsy (ILEA) classification (Scheffer et al. 2017). Approximately 55 patients entered the 4-week Baseline period with 50 patients progressing to receive open-label treatment in Periods A (no more than a total of 24 patients with Lennox-Gastaut syndrome or Dravet syndrome, combined, were included).

In Period A, patients underwent a baseline period of 4-weeks, followed by a 4-week titration period, and a 22-week flexible dosing maintenance period. Patients were treated for a total of 26 weeks in Period A.

In Period B, patients continued to receive ZYN002 for up to an additional 46 weeks at the same maintenance dose they were receiving at Week 26 (e.g. end of Period A). At any time, upon treatment termination, the patient was required to complete the taper and follow-up period. After the final tapered dose, patients were followed weekly for 4 weeks by telephone to complete the Marijuana Withdrawal Checklist short form (Behavior Checklist). After the 4 weeks of follow-up, the patient was discharged from the study.

Patients received twice daily applications (every 12 hours±2 hours) of study drug for the 26-week treatment period and the 46-week extension period (72-week total treatment duration). Upon treatment termination, patients were required to complete a one to three week taper period (depending on dose).

Enrolled patients received weight-based initial doses of 250 mg daily or 500 mg daily of ZYN-002. Patients weighing ≤25 kg could be titrated up to 750 mg daily and patients weighing >25 kg could be titrated up to 1,000 mg daily.

Diagnosis and Criteria for Inclusion

Patients participating in this study had a diagnosis of developmental and epileptic encephalopathy. Patients were between 3 and 18 years of age, and had a body mass index between 13 and 35 kg/m², and weighed no less than 12 kg.

Patients had a diagnosis of developmental and epileptic encephalopathy (DEE) as defined by the International League Against Epilepsy Classification (Scheffer 2017) with generalized motor (i.e. generalized tonic-clonic, tonic, clonic, atonic, epileptic spasms), focal aware motor, focal impaired awareness or focal to bilateral tonic-clonic seizures. Examples of DEE that were enrolled included, but were not limited to: Lennox-Gastaut Syndrome, Dravet Syndrome, West Syndrome/Infantile Spasms and Doose Syndrome. The diagnosis must have been established for ≥1 years and documented by history and examination and review of appropriate studies, which included electroencephalogram (EEG), magnetic resonance imaging (MRI) scan, or genetic testing.

Patients had experienced five or more seizures of the following type(s) in total during the baseline period: generalized motor (i.e. generalized tonic-clonic, tonic, clonic, atonic or epileptic spasms), focal motor, focal impaired awareness or focal to bilateral tonic-clonic seizures. A cluster of epileptic spasms was counted as a single seizure.

Patients had a history of developmental delay with regression, slowing or plateau in at least one developmental domain after seizure onset as determined by the Investigator.

Application Sites

Approved application sites for the gel were the right and left upper arm as specified in Table 3.

TABLE 3

Dosing Application

| CBD Daily Dose (mg) | # of Sachets in Morning | # Sachets in Evening | Application Site Q12H (+/−2 hrs) |
| --- | --- | --- | --- |
| 250 | 1 | 1 | 1 sachet to right or left upper arm/shoulder |
| 500 | 2 | 2 | 1 sachet to each upper right and left upper arm shoulder |
| 750 | 3 | 3 | 2 sachets to either the right or left upper arm/shoulder and 1 sachet to the opposite arm/shoulder. |
| 1000 | 4 | 4 | 2 sachets to each right and left shoulder |

If redness occurred at the application sites, after consultation with Investigator, ZYN002 was temporarily applied to the right and left upper thighs. Patients with low BMIs and/or small arms were allowed to have ZYN002 applied to the upper right or left thighs. Sequence of application was 1 sachet to each upper left and right arm/shoulder and 1 sachet to each right and left upper thigh.

If applied to the right and/or left upper thighs the procedure was the same as described for the left and right upper arms/shoulders. Parents/caregivers applying the gel wore gloves. The parent/caregiver assured that the gel was rubbed in completely, no gel was remaining on the gloves, and the skin surface where the gel was applied was no longer shiny and dry to the touch prior to dressing. Once the patient/caregiver completed the treatment application, they discarded the glove(s) and washed their hands thoroughly with soap and warm water. Parents/caregivers were instructed to keep the application site dry for 6 hours from water or avoid excessive sweating. Parents/caregivers were able to apply an approved moisturizing lotion, 2 hours following dosing. Parents/caregivers were instructed to cover the application site to minimize sun exposure when going outside during the day.

Product, Dosage and Mode of Administration

The product was ZYN002 (Cannabidiol: CBD), 4.2% gel, topical. And the drug was supplied as sachets containing 2.98 g of gel to deliver 125 mg of CBD/sachet. It was applied by using one (1) to four (4) sachets in the morning and evening to achieve the appropriate total daily dose for each patient based upon the treatment group.

The Treatments were as follows:
  Treatment A—125 mg CBD Q12H (±2 hours); for a total daily dose 250 mg CBD (1 sachet in morning and 1 sachet in evening).
  Treatment B—250 mg CBD Q12H (±2 hours); for a total daily dose of 500 mg CBD (2 sachets in morning and 2 sachets in evening).
  Treatment C—375 mg CBD Q12H (±2 hours); for a total daily dose of 750 mg CBD (3 sachets in morning and 3 sachets in evening).
  Treatment D—500 mg CBD Q12H (±2 hours); for a total daily dose of 1000 mg CBD (4 sachets in morning and 4 sachets in evening).

Period A: Baseline Period

During the 4-week Baseline Period, parents and/or caregivers recorded the number of seizures of the following types in a seizure diary:
  Generalized tonic-clonic ("primary generalized tonic-clonic") seizures
  Focal impaired awareness seizures
  Focal to bilateral tonic-clonic seizures
  Focal aware seizures with motor signs
  Tonic seizures
  Clonic seizures
  Atonic seizures
  Epileptic spasms (A cluster of epileptic spasms was counted as a single seizure.)

Seizures of the following types were captured in the daily diary at the same time and for the same duration every day, as determined by the investigator (e.g. 6:00 PM for 10 minutes):
  Myoclonic seizures
  Absence seizures
  Focal aware seizures without motor signs (e.g. focal sensory seizures)

In addition, caregivers rated their impression of absence, myoclonic and focal sensory seizures daily using a 3-point Likert-type scale of 0=no seizures, 1=some seizures and 2=lots of seizures as directed by the Investigator. The Investigator identified the most disabling seizure type the patient experienced. This was based on the clinical view of the Investigator.

Video electroencephalograms (video-EEGs) of 2, 4, or 24 hours in duration were performed at the beginning and end of the study. Information was captured via video-EEG and included characteristics of the waking and sleep EEG background, interictal epileptiform and non-epileptiform abnormalities, and EEG and clinical features of seizures that occurred during the study. Video-EEG interpretation was completed by an independent reviewer. Where additional consent was required to transfer EEG data to the central reviewer, the investigator obtained the consent before the EEG left the site. If the subject/caregiver did not provide consent, the EEGs were not provided for central review. Patients continued to meet inclusion/exclusion criteria to proceed to the treatment period.

Period A: Titration Period

The initial dose for patients <25 kg was 125 mg CBD Q12H (±2 hours), for a total daily dose of 250 mg CBD for the four-week titration period. At the week four visit (Visit 4), based on Investigator discretion, the dose could remain at 250 mg CBD daily or be increased to 250 mg CBD Q12H (±2 hours), for a total daily dose of 500 mg CBD (4 sachets) for the remaining 22 weeks of the treatment period.

Patients weighing >25 kg received 250 mg CBD Q12H (±2 hours), for a total daily dose of 500 mg CBD for the four-week titration period. At the week four visit (Visit 4), based on Investigator discretion, the dose could remain at 500 mg CBD daily or be increased to 375 mg CBD Q12H (±2 hours), for a total daily dose 750 mg CBD (6 sachets) for the remaining 22 weeks of the treatment period.

Period A: Maintenance Period

At Week 10, patients taking 500 mg CBD daily could be increased to 750 mg CBD daily (6 sachets) and patients taking 750 mg CBD daily could be increased to 1000 mg CBD (8 sachets).

The Investigator decreased the dose as needed based on safety and tolerability after the patient started the maintenance period. Patients taking CBD 250 mg Q12H (±2 hours); total daily dose 500 mg CBD could have their dose decreased to 125 mg CBD Q12H (±2 hours); total daily dose 250 mg CBD. Patients taking CBD 375 mg Q12H (±2 hours); total daily dose 750 mg CBD dose could have their dose decreased to 250 mg CBD Q12H (±2 hours); total daily dose 500 mg CBD. Patients taking CBD 500 mg Q12H (±2 hours); total daily dose 1000 mg CBD dose could have their dose decreased to CBD 375 mg Q12H (±2 hours); total daily dose 750 mg or 250 mg CBD Q12H (±2 hours); total daily dose 500 mg CBD. Patients whose weight changed during the course of the study could have their dose increased or decreased.

A taper period ranging from one to three weeks, depending on the patient's dose at the time of the discontinuation, was completed. Following taper, patients were also required to complete a 4-week telephone follow-up period.

Parents/caregivers were instructed to capture seizure frequency and type, and skin irritation scores, within daily diaries. Parents/caregivers also completed:
(1) The University of Washington Caregiver Stress Scale at Day 1, Week 14, and Week 26.
(2) Epilepsy and Learning Disabilities Quality of Life scale (ELDQOL—modified) at Day 1, Week 14 and Week 26.
(3) Sleep Disturbance Scale for Children (SDSC) at Day 1, Week 14 and Week 26.
(4) Vineland Adaptive Behavior Scale-3 (VABS-3) at Day 1 and Week 26.
(5) Parents/caregivers also completed a daily Likert-type "good day/bad day" questionnaire.
(6) Qualitative Caregiver Feedback at Week 26.

Objectives

The Primary Objective of this study was to evaluate the safety and tolerability of ZYN002 in child and adolescent epilepsy patients with developmental and epileptic encephalopathies (DEE) for up to 72 weeks.

The Secondary Objectives was to evaluate the efficacy of ZYN002 in terms of seizure frequency, caregiver stress, quality of life, sleep disturbances, adaptive behavior among epilepsy patients and an overall daily assessment ("good day/bad day").

Criteria for Evaluation

Safety: Safety assessments included collection of AEs, physical and neurological examinations, 12-lead ECG, clinical laboratory assessments (hematology, chemistry and urinalysis), testosterone (males only), Tanner staging scale, pregnancy tests (females of child-bearing potential only), C-SSRS (Children), Marijuana Withdrawal Checklist short form (Behavior Checklist) and findings from the skin check examinations following treatment.

Skin Integrity: Parents/caregivers were provided a diary to complete a daily skin check examination. Parents/caregivers recorded the skin check score in the daily skin check diary once per day in the evening.

Seizure Frequency: The primary efficacy assessment was the median percent change from baseline in the mean monthly (28 day) frequency of seizures (SF28) over 26 weeks (Period A) for the following types, in total ("countable seizures"):
  Generalized tonic-clonic ("primary generalized tonic-clonic") seizures
  Focal impaired awareness seizures
  Focal to bilateral tonic-clonic seizures
Seizure endpoints were summarized monthly.

Secondary seizure endpoints included the median percent change from baseline in SF28 for the following:
  All "countable seizures" (individually and in total):
    Generalized tonic-clonic seizures (GTCS)
    Focal impaired awareness seizures (FIAS)
    Focal to bilateral tonic-clonic seizures (BTCS)
    Tonic seizures (T)
    Clonic seizures (C)
    Atonic seizures (AT)
    Epileptic spasms (ES)
    Focal aware seizures with motor signs (FM)
  All focal-onset seizures (FIAS, BTCS, FM)
  Seizure type identified (at Baseline) as the most disabling overall:
The frequency of the following types of seizures during the daily period of observation that consistently occurred with a countable frequency:
  Myoclonic seizures (M)
  Absence seizures (A)
  Focal aware seizures without motor signs (focal sensory seizures) (FAS)
  Other efficacy endpoints included:
  Change from Baseline to Weeks 14, 26, and 50/ET in The University of Washington Caregiver Stress Scale—total score;
  Change from Baseline to Weeks 14, 26 and 50/ET in the subscale scores of the ELDQOL-modified;
  Change from Baseline to Weeks 14, 26 and 50/ET in the total and subscale scores of the SDSC;
  Change from Baseline in the "good day/bad day" assessment was assessed for each period utilized to assess seizure frequency; and
  Change from Baseline to Week 26 and Week 50/ET in the VABS-3 composite and subscale scores.

At week 26, clinicians captured qualitative caregiver feedback at Week 26 with the following questions asked: (1) "Has anything improved for [patient name] and your family since [patient name] has been using the gel?"; (2) "Has anything got worse since for [patient name] and your family since [patient name] has been using the gel?"; and (3) "Let me just ask about a few specific things: Daily activities e.g. school attendance? If so how? Alertness? If so how?".

Results

The data indicates that ZYN-002 reduced seizure frequency in many types of difficult to treat developmental and epileptic encephalopathies. It also improved important behavioral deficits, alertness, social interactions, and enabled the child to be well enough to attend school more consistently. DEEs are the most challenging and poorly controlled epilepsy disorders with many symptoms that adversely affect patient and family function.

These results indicate meaningful reductions in seizures and improvements in many of the difficult behaviors and symptoms, such as seizure intensity, fatigue, social isolation, poor cognition, and language deficits.

Of the 48 patients enrolled, 21 patients had completed the taper period and discontinued study treatment while 27 remained ongoing. Only one subject discontinued because of an adverse event.

Seizures and Seizure Frequency

Of the 48 enrolled patients, 33 (approximately 70%) had focal impaired-awareness seizures (FIAS; previously known as complex partial seizures) and/or convulsive seizures (focal to bilateral tonic-clonic seizures and generalized tonic-clonic seizures, BTCS and GTCS, respectively) at baseline.

Referring to FIG. 1, compared to baseline seizure frequency, these patients experienced a greater than or equal to 44% median reduction in seizures from month 2 onwards using monthly seizure frequency normalized to 28 days (SF28). Thirteen of the 46 patients had a variety of non-FIAS and non-convulsive seizure types at baseline. Fifty-five percent (55%) of patients with FIAS and/or convulsive seizures experienced a ≥50% median reduction in seizures at month 6 of treatment. Patients with either DS or LGS who experienced FIAS and/or convulsive seizures (n=11) experienced a 51% median reduction in FIAS and/or convulsive seizures at month 6 of treatment compared to baseline. Sixty percent (60%) of patients with DS or LGS experienced a ≥50% median reduction in FIAS or convulsive seizures at month 6 of treatment.

Qualitative Caregiver Feedback: Qualitative Analysis of the Impact of ZYN-001 on Behavioral and Cognitive Impairment Parents and caregivers were asked to provide a qualitative assessment of their child's overall experiences with ZYN-002 across the treatment period. The top line results included:

53% reported improved vitality (e.g. alertness/awareness, energy).

51% reported improvement in seizures.

47% reported improved cognition and concentration.

44% reported improved engagement/participation, improved relationships, improved speech/communications and socially avoidant behaviors.

28% reported that their child attended school on time/more often.

26% reported difficulty in application of the gel to their child (e.g. time it takes for gel to dry).

Two naive-independent coders conducted data analysis in parallel. Coding was complete in Atlas.ti software. Any caregiver report in their child's signs, symptoms, or other experiential occurrences was coded. 43 participant responses were coded. The results are in Table 4, and tallies are based on Absolute Mentions, i.e., allowing for multiple mentions per patient).

TABLE 4

Qualitative Caregiver Feedback Results

| Response (43 total) | Coder 1 | Coder 2 | Example |
|---|---|---|---|
| Improvement | | | |
| Attending school on time/more often | 13 | 13 | School - now attending full days for a full week - previously only going half days a few times a week so remarkable improvement. |
| Decreased aggression/violence | 3 | 3 | He is less aggressive, calmer. |
| Improved alertness | 22 | 22 | More alert when given simple commands. |
| Improved behavior | 11 | 11 | Social improvement, having better days, making friends and not being social isolated from peers due to his change in his behavior. |
| Improved cognition | 18 | 18 | Cognitive shift, better understanding when asked to do something. |
| Improved concentration | 12 | 12 | Longer periods of being settled, able to complete an activity he starts. |
| Improved engagement/participation | 21 | 21 | More of a willingness to learn and do the things he was missing out on. |
| Improved mood | 9 | 9 | He is happier, more engaged and able to now wave at people. |
| Improved relationships | 5 | 5 | Other children are interacting with him more as they are now not afraid of him |

TABLE 4-continued

Qualitative Caregiver Feedback Results

| Response (43 total) | Coder 1 | Coder 2 | Example |
| --- | --- | --- | --- |
| Improved sleep | 3 | 3 | Improvement in seizures, sleeping better, prior to the trial she was lethargic not doing much. |
| Improved speech/communication | 7 | 7 | Behavior, language, and cognitive improvement, more aware. |
| Increased mobility | 3 | 3 | Slight improvement in myoclonic jerks. |
| Less convulsive behavior | 1 | 1 | |
| Less hospital visits | 4 | 4 | Less ICU admissions. |
| Less migraines | 1 | 1 | |
| More energy/less fatigue | 17 | 17 | He had a bit more spark and energy. |
| Postictal state improvement | 7 | 7 | Improved recovery time from small seizures - usually takes 30 min to recovery but now only a few minutes. |
| Reduced amplitude/intensity of seizure | 9 | 9 | It has reduced her seizure frequency and severity/duration (which they acknowledged is not captured by the diary). |
| Reduced injuries | 2 | 2 | Less injuries resulting from atonic seizures. |
| Reduction in duration of seizure | 11 | 11 | Yes! Seizures have had a significant reduction, they are less frequent and also shorter. |
| Reduction in frequency of seizure | 18 | 18 | Better as seizures less frequent. |
| Short term cognition improvement | 1 | 1 | |
| Short term reduction in amplitude/intensity of seizure | 1 | 1 | |
| Short term reduction in frequency of seizures | 4 | 4 | Seizure frequency reduced with dose changes (both increased and decreased doses), which had a 2-4 week "honeymoon period". Then seizures would return to baseline frequency. |
| Worsening | | | |
| Attending school later/less frequently | 1 | 1 | |
| Change in seizure semiology | 1 | 1 | |
| Decreased alertness | 4 | 4 | Less alert. |
| Decreased appetite | 1 | 1 | |
| Decreased mobility | 2 | 2 | Greater difficulty in transferring child to and from wheelchair etc, walking ability. |
| Difficulty in applying gel | 11 | 11 | Application of the gel, not fun, time consuming. |
| Eating difficulty | 1 | 1 | |
| Increased anxiety | 1 | 1 | |
| Increased aggression/violence | 1 | 1 | |
| Increase in frequency of seizures | 4 | 4 | Increase in seizure frequency. |
| Increased postictal state | 1 | 1 | |
| More fatigue/less energy | 3 | 3 | Alertness - lethargic. |
| Negative impact on circadian rhythm | 1 | 1 | |
| Negative reaction at gel application site | 8 | 8 | Sensitive skin/skin rashes. |
| Weight loss | 1 | 1 | |

TABLE 4-continued

Qualitative Caregiver Feedback Results

| Response (43 total) | Coder 1 | Coder 2 | Example |
|---|---|---|---|
| Worsened behavior | 6 | 6 | Due to tantrums and application duration for the sachet's she has been going to school later than normal. |
| Worsened speech/communication | 2 | 2 | Less verbal mimicry. |

Table 5 provides a complete tally of patient mentions.

TABLE 5

Complete Tally of Patient Mentions

| Response (43 total) | # of Patient Mentions Coder 1 | # of Patient Mentions Coder 2 |
|---|---|---|
| *Improvement* | | |
| Attending school on time/more often | 12 | 12 |
| Decreased aggression/violence | 2 | 2 |
| Improved alertness | 17 | 17 |
| Improved behavior | 9 | 9 |
| Improved cognition | 14 | 14 |
| Improved concentration | 10 | 10 |
| Improved engagement/participation | 15 | 15 |
| Improved mood | 8 | 8 |
| Improved relationships | 5 | 5 |
| Improved sleep | 3 | 3 |
| Improved speech/communication | 7 | 7 |
| Increased mobility | 2 | 2 |
| Less convulsive behavior | 1 | 1 |
| Less hospital visits | 4 | 4 |
| Less migraines | 1 | 1 |
| More energy/less fatigue | 12 | 12 |
| Postictal state improvement | 6 | 6 |
| Reduced amplitude/intensity of seizure | 9 | 9 |
| Reduced injuries | 2 | 2 |
| Reduction in duration of seizure | 9 | 9 |
| Reduction in frequency of seizure | 16 | 16 |
| Short term cognition improvement | 1 | 1 |
| Short term reduction in amplitude/intensity of seizure | 1 | 1 |
| Short term reduction in frequency of seizures | 3 | 3 |
| *Worsening* | | |
| Attending school later/less frequently | 1 | 1 |
| Change in seizure semiology | 1 | 1 |
| Decreased alertness | 2 | 2 |
| Decreased appetite | 1 | 1 |
| Decreased mobility | 2 | 2 |
| Difficulty in applying gel | 11 | 11 |
| Eating difficulty | 1 | 1 |
| Increased anxiety | 1 | 1 |
| Increased aggression/violence | 1 | 1 |
| Increase in frequency of seizures | 3 | 3 |

TABLE 5-continued

Complete Tally of Patient Mentions

| Response (43 total) | # of Patient Mentions Coder 1 | # of Patient Mentions Coder 2 |
|---|---|---|
| Increased postictal state | 1 | 1 |
| More fatigue/less energy | 2 | 2 |
| Negative impact on circadian rhythm | 1 | 1 |
| Negative reaction at gel application site | 8 | 8 |
| Weight loss | 1 | 1 |
| Worsened behavior | 3 | 3 |
| Worsened speech/communication | 2 | 2 |

Safety

ZYN-002 was well tolerated. Eight patients discontinued the study; one discontinued as a result of an adverse event (skin reaction), and seven discontinued as a result of withdrawal of consent or perceived lack of efficacy. During the baseline period (prior to the start of study treatment), 14 (29.2%) of the 48 enrolled patients reported a total of 22 AEs. Through six months of therapy, 96% of patients experienced a treatment emergent adverse event (TEAE) and 60% of patients experienced a TEAE related to study treatment. There were no apparent trends for an increase in incidence AEs with increasing ZYN002 dose level. TEAEs were reported for 12 of 21 (57.1%) patients during the taper period. Most TEAEs were mild to moderate, and transient. The most frequently reported TEAEs by preferred term were upper respiratory tract infection (41.7% of patients), nasopharyngitis (20.8%), somnolence (12.5%), and vomiting (10.4%). The next most frequently reported TEAEs were application site dryness (8.3%), application site pain (8.3%), and somnolence (8.3%). Ten patients (20.8%) reported a serious adverse event (SAE) during the treatment period and 1 patient (4.8%) during the taper period; eight were infection-related and two were exacerbations of epilepsy. Two SAEs (lower respiratory tract infection and status epilepticus) were considered to be possibly related to treatment. There were no patient deaths during the study.

Example 2: Study of Four Patients with SYNGAP1

In Study ZYN2-CL-025 (BELIEVE), there were four patients with SYNGAP1 as shown in Table 5.

TABLE 6

Patient Data for Patients with SYNGAP1 in BELIEVE Clinical Trial

| Age | Gender | Syndrome | Dose | Seizures | Qualitative Feedback |
|---|---|---|---|---|---|
| 9 yrs. old | Female | Epilepsy with absence with eyelid myoclonia/ Epilepsy with Myoclonic-atonic seizures | 1000 mg ZYN002 | AT (−7.6%) T (+26.6%) Total (+5.2%) | Not Done |

TABLE 6-continued

Patient Data for Patients with SYNGAP1 in BELIEVE Clinical Trial

| Age | Gender | Syndrome | Dose | Seizures | Qualitative Feedback |
|---|---|---|---|---|---|
| 3.5 yrs. old | Male | Epilepsy with myoclonic-atonic seizures | 750 mg ZYN002 | AT (−4.3%) T (+20.0%) Total (−2.8%) | Not Done |
| 6.5 yrs. old | Female | Epilepsy with absence with eyelid mycolonia/ Epilepsy with Myoclonic-atonic seizures | 1000 mg ZYN002 | AT (−73.4%) Total (−73.4%) | Significant improvement - stopped drop attacks and reduced negative myoclonus and absence (staring). Moderate improvement in learning ability and attention. No change in alertness. Not drowsy. Better school attendance, full days (5 days per week), previously 2-4 days per week. Improved mood and behavior. "Huge improvements" overall. |
| 11.5 yrs. old | Male | Epilepsy with absence with eyelid mycolonia/ Epilepsy with Myoclonic-atonic seizures | 750 mg ZYN002 | FIAS (−48.9%) Total (−48.9%) | Slight improvement in myoclonic jerks, less of the throat clearing. In the past 6 months, there has been improvement in coordination and transitions between activities at school. Appears to understand and follow instructions better. Has always attended school, but since the gel, is more engaged in school activities. He is happier, more engaged and able to now wave to people. |

For the 3.5-year-old and 9-year-old patients, qualitative feedback was not done. For the 6.5-year-old and 11.5-year-old patients, qualitative feedback was done. For 6.5-year-old patient, the qualitative feedback indicated an "huge improvement overall." And, for the 11.5-year-old, the qualitative feedback indicated the patient is "happier, more engaged and able to now wave at people."

What is claimed is:

1. A method of treating behavioral problems and seizures in a subject having developmental and epileptic encephalopathy (DEE), the method comprising:
   transdermally administering an effective amount of cannabidiol (CBD) to the subject, wherein behavioral problems are treated in the subject; and
   wherein the seizures treated are focal impaired awareness seizures (FIAS).

2. The method of claim 1, wherein treatment includes an improvement in quality of life as measured by an improvement in the Epilepsy and Learning Disabilities Quality of Life (ELDQOL) scale within 2 weeks, 4 weeks, or 8 weeks.

3. The method according to claim 1, wherein treatment includes a decrease in sleep disturbance as determined by an improvement of the Sleep Disturbance Scale for Children (SDSC) within 2 weeks, 4 weeks, or 8 weeks.

4. The method according to claim 1, wherein treatment includes an improvement in adaptive behavior as determined.

5. The method according to claim 1, wherein treatment includes an improvement in caregiver stress as measured by an improvement the University of Washington Caregiver Stress Scale within 2 weeks, 4 weeks, or 8 weeks.

6. The method according to claim 1, wherein treatment includes an improvement in every day satisfaction and well-being.

7. The method according to claim 1, wherein treatment includes an improvement in cognition and awareness.

8. The method according to claim 1, wherein the subject has no erythema or minimal erythema.

9. The method according to claim 1, wherein the treatment includes a monthly reduction in focal impaired awareness seizures and convulsive seizures.

10. The method according to claim 1, wherein the effective amount of CBD is 250, 500, 750, or 1000 mg total daily.

11. The method according to claim 1, wherein the CBD is administered in a single daily dose.

12. The method according to claim 1, wherein the CBD is administered in two daily doses.

13. The method according to claim 1, wherein the CBD is a synthetic CBD.

14. The method according to claim 1, wherein the DEE is Lennox-Gastaut Syndrome.

* * * * *